United States Patent
Farr

[19]

[11] Patent Number: 6,084,824
[45] Date of Patent: Jul. 4, 2000

[54] OPTICAL CARD READER INCLUDING MECHANICAL SCANNING ASSEMBLY

[75] Inventor: Mina Farr, Palo Alto, Calif.

[73] Assignee: Hewlett-Packard Company, Palo Alto, Calif.

[21] Appl. No.: 09/175,891

[22] Filed: Oct. 20, 1998

[51] Int. Cl.$^7$ ........................................ G06K 7/10
[52] U.S. Cl. .......................... 365/234; 365/64; 235/454; 235/476; 235/479
[58] Field of Search ...................... 365/64, 234; 235/454, 235/476, 479

[56] References Cited

U.S. PATENT DOCUMENTS

| | | | |
|---|---|---|---|
| 4,423,317 | 12/1983 | Berrezowski et al. | 235/458 |
| 4,796,242 | 1/1989 | Pierce | 369/2 |
| 4,864,113 | 9/1989 | Ogura | 235/477 |
| 5,179,268 | 1/1993 | Nitto et al. | 235/454 |
| 5,379,266 | 1/1995 | Russel . | |
| 5,436,871 | 7/1995 | Russel . | |
| 5,465,238 | 11/1995 | Russel . | |
| 5,511,035 | 4/1996 | Russel . | |
| 5,541,888 | 7/1996 | Russel . | |

FOREIGN PATENT DOCUMENTS

| | | |
|---|---|---|
| 62-080862 | 4/1987 | Japan . |
| 62-120637 | 6/1987 | Japan . |

*Primary Examiner*—Viet Q. Nguyen

[57] ABSTRACT

An optical reader includes a mechanical scanning assembly for scanning an optical card such as an OC-ROM. The scanning assembly includes a linear LED array, a linear detector array and a carrier for moving the LED array and the detector array jointly in a linear scanning direction. When the LED array illuminates a data patch on the optical card, a bit image of the data patch is focused onto the detector array. The bit image is read out as a serial stream of data. A data patch can be randomly accessed by moving the scanning assembly to a row including the data patch and turning on an LED located over the data patch.

20 Claims, 5 Drawing Sheets

OPTICAL CARD READER INCLUDING MECHANICAL SCANNING ASSEMBLY

BACKGROUND OF THE INVENTION

The present invention relates to data storage devices. More specifically, the present invention relates to a method and apparatus for reading data from an optical card.

Efforts are continually being made to increase portability of notebook computers. Portability can be enhanced by reducing the size and weight of the notebook computer. Portability can also be enhanced by reducing power consumption. Lowering power consumption can increase battery life and extend the time that the notebook computer can be used without an ac adapter.

Most notebook computers include an internal CD-ROM drive. However, the CD-ROM drive tends to increase the size and weight of the notebook computer.

Additionally, the CD-ROM drive has a number of components. A typical CD-ROM drive includes optics for reading data from a CD-ROM disc, a retractable carrier for the CD-ROM disc, and motors for spinning a CD-ROM disc and retracting the carrier. Each component is subject to failure. Each component also adds to the cost of the CD-ROM drive.

The CD-ROM drive also consumes battery power. Operating the motors, especially the motor that spins the disc, drains the battery of the notebook computer.

Optical readers other than CD-ROM drives have been proposed. Among the proposed optical readers is an optical card reader. The optical card reader reads data stored on an optical card or OC-ROM, perhaps the size of a credit card, without any mechanical movement. To read data from the OC-ROM, the optical reader steers a beam of light across data patches on an upper surface of the OC-ROM. The data patches, and a lenslet array within the OC-ROM, cause bit images to be focused onto a detector array of the optical reader. The bit images are detected by the detector array and read out to electronics for further processing. Such an optical card reader allows large amounts of data to be stored on and read out from a single OC-ROM. Additionally, the OC-ROM is compact, low in cost, rugged, and factory-publishable. Reading the OC-ROM uses less power than reading a CD-ROM disc.

However, a steering lens and other optics (e.g., curved mirrors, beam splitters), which steer the beam across the OC-ROM, cause the optical reader to have a high profile, too high to be considered practical for use in a portable device such as a notebook computer. Moreover, the steering lens and the other optics add to the cost and weight of the optical card reader.

There is a need for a high capacity data storage device that has a lower profile and lighter weight than the CD-ROM drive and the optical card reader. There is also a need for a high capacity storage device that consumes less power and has a lower cost than the CD-ROM drive and the optical card readers.

SUMMARY OF THE INVENTION

The present invention may be regarded an optical card reader that reads data from an optical card without using beam-steering optics. The optical reader includes an optical card guide, a carrier movable along the card guide in a linear scanning direction, an illuminator mounted to the carrier, and a detector mounted to the carrier. The illuminator has a light-emitting surface, and the detector has a light-receiving surface. The light-emitting surface is opposite and spaced apart from and the light-receiving surface. When moved in the scanning direction, the carrier moves the illuminator jointly with the detector. Such an optical card reader has a very low profile, light weight, and low power consumption, which makes it especially attractive for use in notebook computers and other portable electronic devices such as personal digital assistants, smart phones, portable printers, portable scanners and handheld games.

Other aspects and advantages of the present invention will become apparent from the following detailed description, taken in conjunction with the accompanying drawings, illustrating by way of example the principles of the present invention.

DETAILED DESCRIPTION OF THE INVENTION

As shown in the drawings for purposes of illustration, the invention is embodied in an optical card reader, which can read data stored on an optical card such as an OC-ROM. An optical card can presently store over 100 megabytes of data. Therefore, the optical reader can access large amounts of data from a single optical card. Yet the optical reader has a low profile, light weight, low power consumption and relatively few parts. Such an optical reader lends itself for use in notebook computers and other portable electronic devices such as personal digital assistants, smart phones, portable printers, portable scanners and handheld games. In the paragraphs that follow, the optical card reader will be described in detail. First, however, a description of an optical card for the optical reader will be provided.

Figure 1:
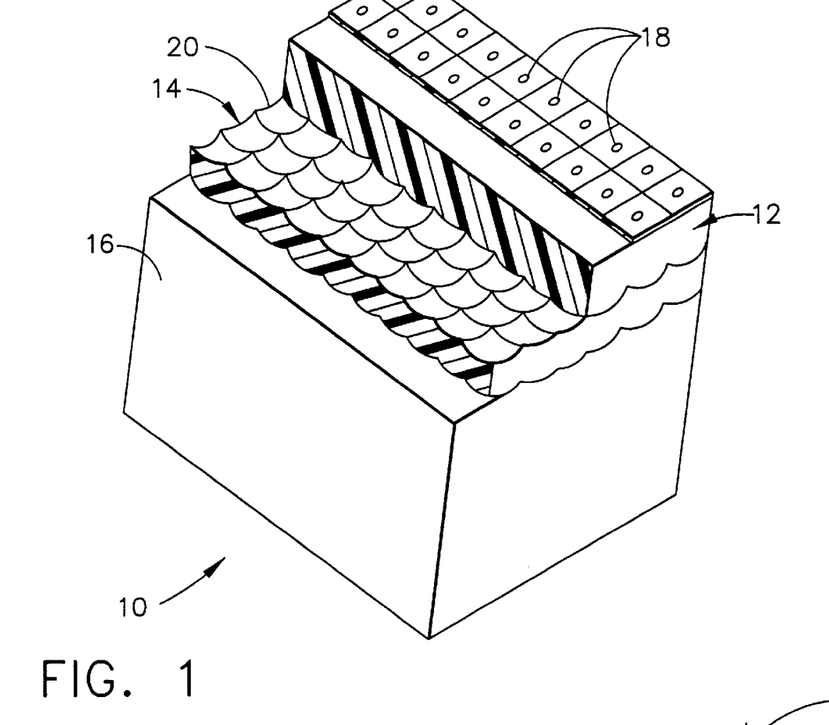
FIG. 1 is an illustration of a section of an exemplary optical card.
Figure 2:
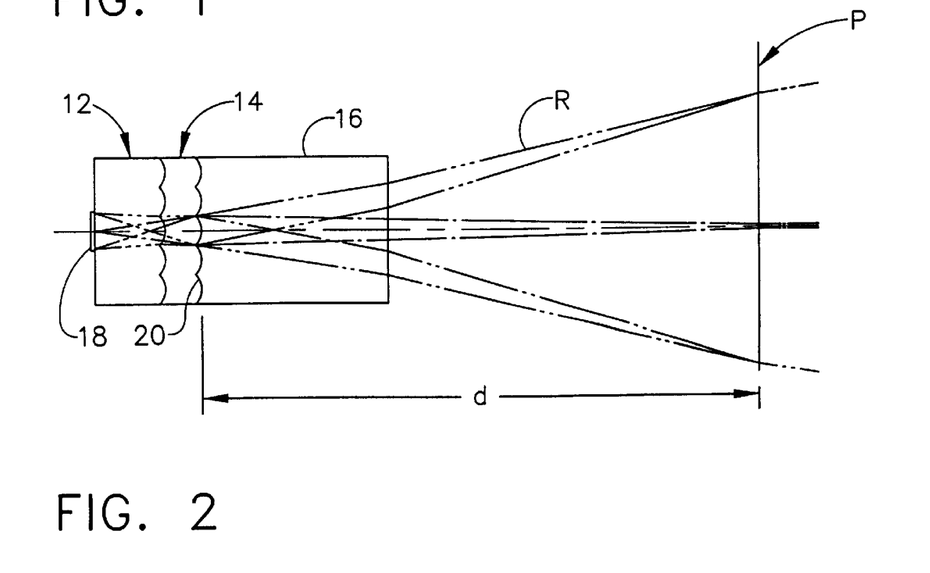
FIG. 2 is an illustration of a single data patch being imaged onto an imaging plane, the data patch forming a part of the optical card.

Reference is made to FIGS. 1 and 2, which illustrate a possible geometry of an optical card 10. In general, the optical card 10 includes three layers: a data layer 12, a lenslet layer 14 and a substrate 16. All three layers 12, 14 and 16 are made of a high optical quality plastic (e.g., optical-quality polycarbonate) that transmits light having a particular wavelength. Additionally, all three layers 12, 14 and 16 are laminated at edges of the optical card 10.

The data layer 12 is relatively flat. A plurality of data patches 18 are embossed or deposited on a surface of the data layer 12. The data patches 18 are arranged in rows and columns. Each data patch 18 includes a dense pattern of transmissive and non-transmissive regions (that is, transmissive and non-transmissive to the light having the particular wavelength). A transmissive region might represent a digital "1" while a non-transmissive region represents a digital "0." The data layer 12 can be protected by a deposition of a very thin transparent over-layer.

The lenslet layer 14 includes an array of double-sided embossed lenslets 20. There is a lenslet 20 for each data patch 18. Each lenslet 20 in the array is aligned with its corresponding data patch 18 and focuses a corresponding two-dimensional bit image of a data patch 18 onto an imaging plane P (FIG. 2 shows a single data patch 18 that is being imaged onto the imaging plane P, with rays of light being indicated by a letter R.). The lenslets 20 also magnify the bit images of the data patches 18. The data patches 18 and the lenslets 20 have fixed spatial relationships in order for all of the bit images to be focused onto the same imaging plane P. Close bonding of the data layer 12 to the lenslet layer 14 ensures a fixed relative position between the data patches 18 and their corresponding lenslets 20, making image distance d and lateral positioning independent of thermal expansion and mechanical movement.

The substrate 16 provides a backing for the data layer 12 and the lenslet layer 14. Also relatively flat, the substrate 16 may be bonded to the lenslet layer 14.

The optical card 10 can have a thickness of less than one millimeter. The thickness of the lenslets 20 is made small in order to keep a reasonable magnification within a small image distance d. For example, the data layer 12 can have a thickness of approximately 150 microns, the lenslet layer 14 can have a thickness of approximately 100 microns, and the substrate 16 can have a thickness of approximately 500 microns. An array of lenslets 20 having a 100 micron thickness is capable of providing 8× magnification and focusing light on an imaging plane P that is just outside the substrate 16. The lenslet layer 14 could include a 400×600 array of lenslets 20, and the data layer 12 could include a 400×600 array of corresponding data patches 18. Such an optical card 10 could store approximately 125 megabytes of data.

Figure 3:
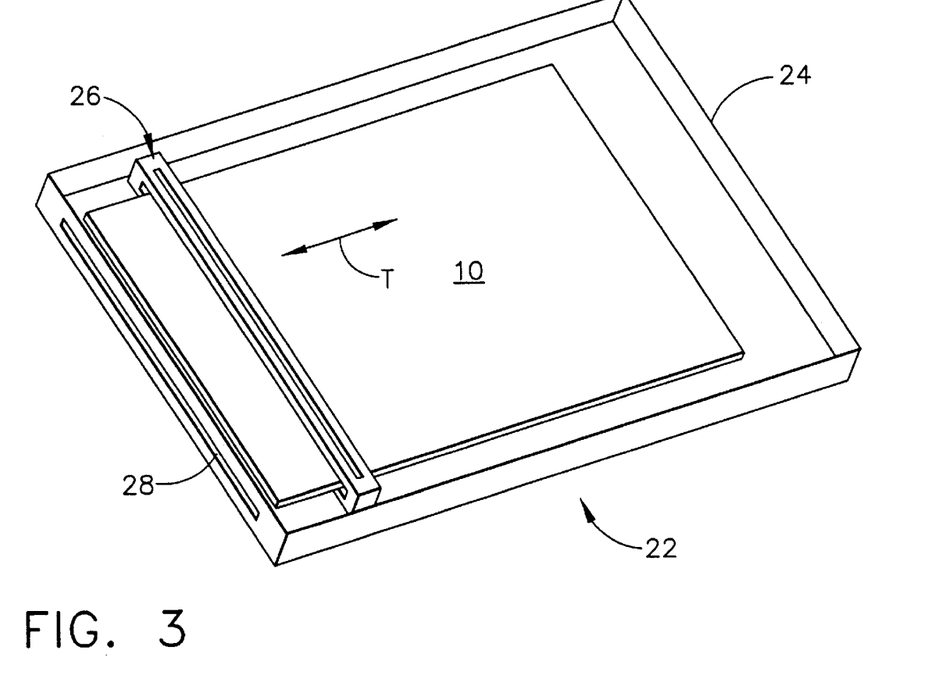
FIG. 3 is an illustration of an optical card reader for reading data stored from an optical card.
Figure 4:
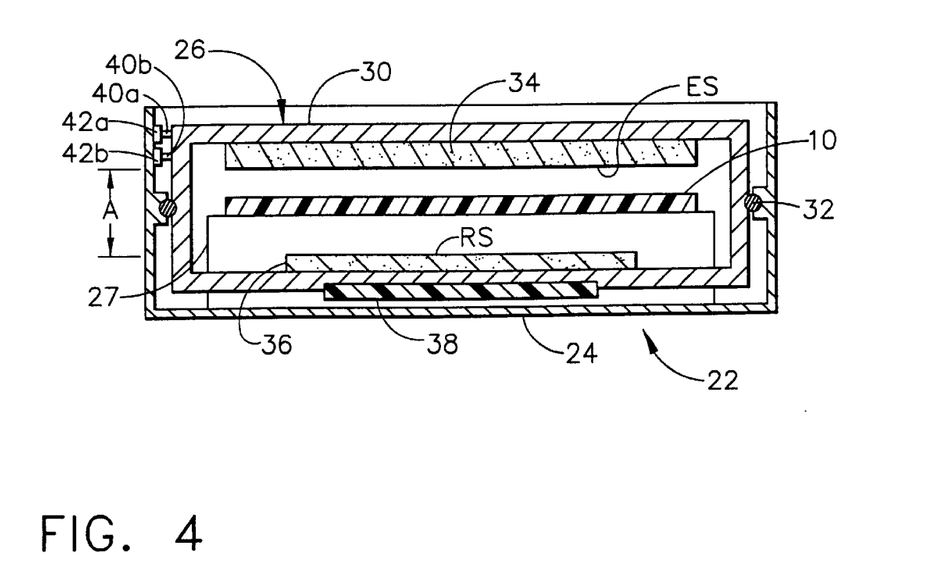
FIG. 4 is a cross-sectional view of the optical card reader and an optical card that has been inserted in the optical card reader.
Figure 5:
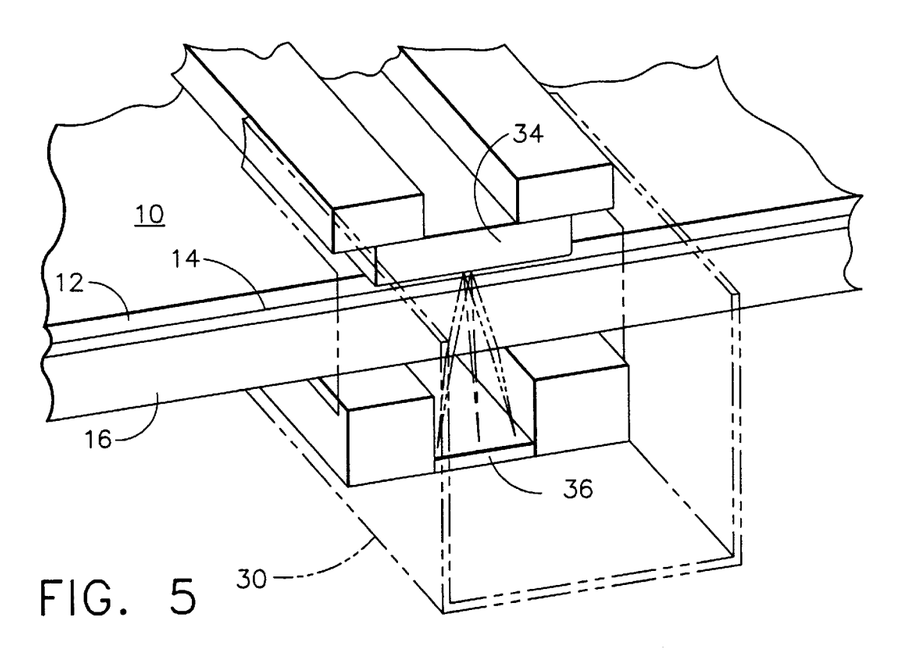
FIG. 5 is an enlarged view of a portion of a scanning assembly, which forms a part of the optical card reader.

FIGS. 3, 4 and 5 illustrate an optical card reader 22 for reading data stored on the optical card 10. The optical card reader 22 includes an optical card guide 24 and a mechanical scanning assembly 26 that is moved along the card guide 24 in a linear scanning direction, which is indicated by an arrow T. The optical card 10 is inserted into a slot 28 in the card guide 24. The card guide 24 receives and supports the optical card 10 such that rows of data patches 18 in the data layer 12 can be scanned by the mechanical scanning assembly 26. For example, one end of the optical card 10 could be supported on a pedestal 27. The card guide 24 could include a protective cover; however, the protective cover is optional (FIGS. 3 and 4 show the card guide 24 without a protective cover).

The mechanical scanning assembly 26 includes a carrier 30, which is movable along rails 32 of the card guide 24; a linear LED array 34, which is mounted to an upper portion of the carrier 30; and a detector array 36, which is mounted to a lower portion of the carrier 30. When moved in the scanning direction T, the carrier 30 moves the LED array 34 jointly with the detector array 36. A light-emitting surface ES of the LED array 34 is opposite and spaced apart from a light-receiving surface RS of the detector array 36. When the optical card 10 is inserted into the card guide 24, the data layer 12 faces the LED array 34, the substrate 16 faces the detector array 36, and the imaging plane P of the optical card 10 is roughly coincident with the light-receiving surface RS of the detector array 36. The carrier 30 can be made of plastic, with the LED array 34 and the detector array 36 being molded into the carrier 30. Molding the LED array 34 and the detector array 36 into the carrier 30 forms a solid unit that is less prone to mechanical misalignments.

The LED array 34 and the detector array 36 are spaced apart by a distance A that is approximately equal to the sum of: (1) the thickness of the optical card 10; and (2) a clearance thickness that is sufficient to allow the optical card 10 to be inserted into the card guide 24 without coming in contact with either the detector array 36 or the LED array 34. For example, the light emitting and light-receiving surfaces ES and RS may be spaced apart by a distance A of approximately one millimeter in order to accommodate an optical card 10 having a thickness of approximately 750 microns.

LEDs of the LED array 34 emit light at a wavelength that can be transmitted by the optical card 10. The LEDs in the array 34 are arranged in a single row, there being a sufficient number of LEDs to illuminate each of the data patches 18 in a given row of the optical card 10. Typically, one LED will be provided per data patch 18. Therefore, the LED array 34 will include a linear array of 400×1 LEDs for an optical card 10 that is 400 data patches 18 wide.

The LED array 34 having a single row of LEDs can cover a single row of data patches 18 at any given position of the carrier 30. In order to illuminate the data patches 18 in other rows, the LED array 34 is moved up and down the optical card 10 by the carrier 30 in the scanning direction T.

Data patches 18 in a row are electronically accessed one at a time. A specific data patch 18 is electronically accessed by turning on a specific LED in the array 34. Thus, only a single LED is illuminated at a given time. Of course, an entire row of data patches 18 might be accessed. To electronically access an entire row, the LEDs in the array 34 are turned on serially, starting from the first LED in the array 34, and ending at the last LED in the array 34. In this manner, data can be accessed mechanically in the scanning direction T and accessed electronically in a direction orthogonal to the scanning direction. Thus, by moving the carrier 30 to a specific row and illuminating a specific LED in the array 34, the optical card reader 22 can perform random access of the data stored in that patch 18. By moving the carrier to a specific row and electronically accessing the entire row, the optical card reader 22 can perform semi-random access of the data stored in a row of data patches 18.

When a data patch 18 is illuminated, a magnified bit image corresponding to that data patch 18 is focused onto the image plane P and, therefore, onto the light-receiving surface RS of the detector array 36. The detector array 36 may be a two dimensional array of photosensitive elements arranged in a strip form. The detector array 36 may be an active pixel sensor such as a charge-coupled device or CMOS sensor. Because the detector array 36 is several centimeters long, smaller arrays of photosensitive detector elements might be made on separate chips and then attached end to end along a supporting bar to obtain a desired array length.

The detector array 36 would typically perform bi-level (black and white) detection of the bit images. However, the detector array 36 could perform gray level detection if its dynamic range is large enough.

The detector array 36 is large enough to detect light from at least one bit image. Additionally, each detector element is small enough to detect a bit in the bit image. The detector array 36 could include a 100×3500 array of detector elements for the optical card 10 having a 400×600 array of data patches 18.

Figure 6:
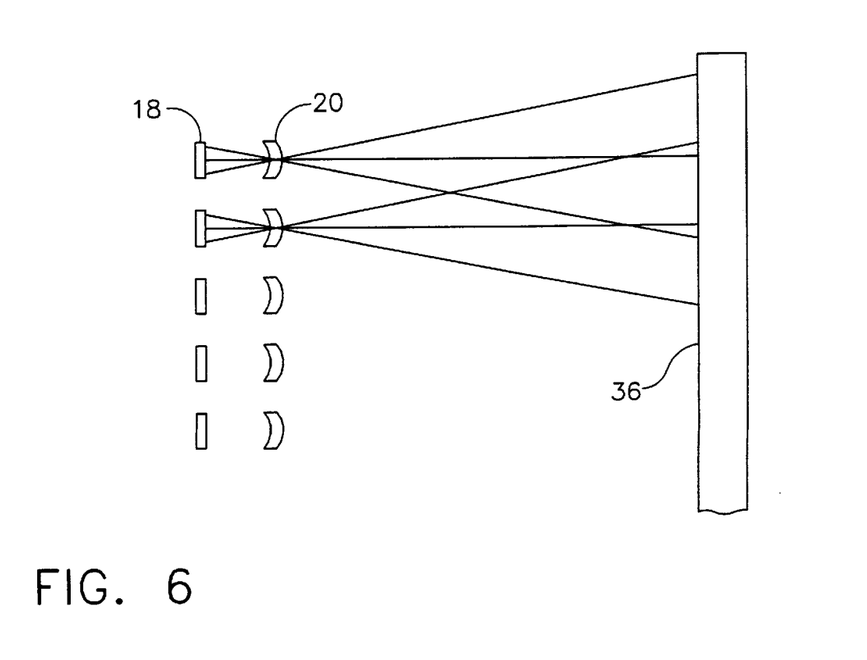
FIG. 6 is a diagram of ray traces for two adjacent data patches on the optical card.

Magnified bit images of adjacent data patches 18 may overlap on the light receiving surface RS of the detector array 36. This overlap is illustrated in FIG. 6. The overlap allows the same detector element to sense different data patches and the detector array 36, as a whole, to capture more bits of data than its array size. The overlapping of the images on the detector array 36, and the ratio of the detector pixels to the number of bit images focused on the detector array 36, depends on the magnification power used by the lenslets 20. Thus, a one-to-one correspondence of detector elements to data patches 18 is not required. Resulting is a smaller, less expensive detector array 36. Due to the overlap, however, neighboring data patches 18 are not illuminated simultaneously. Still, access time of a multiple data patches in a row can be increased by simultaneous illumination of non-overlapping data patches 18.

As the scanning assembly 26 is being positioned over a row of data patches 18, one of the LEDs in the detector array 36 can be kept on. Once a data patch 18 is aligned with the detector array 36, the detector array 36 reads out a stream of data corresponding to the detected bit image. Alignment is detected when positional indicators (e.g., fiducial marks, pin holes) in the optical card 10 become aligned with detector elements on the detector array 36. One or more detector elements in the detector array 36 could be dedicated to reading the positional indicators.

The optical card reader 22 also includes a means (not shown) for moving the scanning assembly 26 along the card guide 24. The means for moving the scanning assembly 26 might include a motor-driven belt drive. Alternatively, the means for moving the scanning assembly 26 might include an electromechanical guiding/stepping unit such as an indexed stepper. The index stepper might include small permanent magnetic regions (e.g., permanent magnets) on the carrier 30 and small electromagnetic regions on an inner wall of the card guide 24. Reversing poles on the electromagnetic regions on the card guide wall would propel the carrier unit 30 in the scanning direction T. Instead of using permanent magnetic regions on the carrier 30, small projections of ferromagnetic material could extend from the carrier 30 towards the card guide wall. The small projections would provide different magnetic flux paths for the electromagnetic regions. When an electro-magnetic region on the wall is energized, the projections offering the lowest reluctance flux path are moved into alignment with the energized electromagnetic region, thereby moving the carrier 30 in the scanning direction T.

Various functions such as controlling the position of the scanning assembly 26 along the guide rails 32, performing positional correction of the bit image focused on the detector array 36, and sequencing the illumination sequence of the LEDs in the LED array 34 are performed by processing electronics mounted on a printed circuit board 38. Positional control of the scanning assembly 26 might be performed by counting the number of position indicators and, therefore, the number of rows traversed in the scanning direction T. In the alternative, the positional indicators might identify an absolute row position.

The processing electronics also buffers the data read out from the optical reader 22 and performs other functions such as error correction on the buffered data. The data is encoded to minimize the possibility of errors arising from imaging errors, noise in the processing electronics, defects in the optical card 10, etc. Any one of a number of two-dimensional coding schemes could be used to encode the data stored on the optical card 10. The coding scheme might guarantee that each bit in a bit image is surrounded by a specific number of 1's and 0's. Such a coding scheme is commonly used in linear recording.

The printed circuit board 38 may be mounted to or embedded in the carrier 30. Mounted to the printed circuit board 38 are a RAM buffer and one or more chips for performing the various functions. In the alternative, the various functions could be performed by processing electronics in the host (e.g., a notebook computer) or by a printed circuit board assembly on a PCMCIA card, which would be external of the optical card reader 22.

The carrier assembly 26 further includes a means for supplying power and communications to the LED array 34 and the detector array 36. For example, the power and communications could be supplied to the LED array 34 and the detector array 36 by conventional flexible wire strips or by conductive sidewalls 40a and 40b mounted to the card guide wall and probes 42a and 42b (e.g., solder bumps) extending from an end of the carrier 30 (see FIG. 4). The contact probes 42a and 42b make physical contact with their respective conductive sidewalls 40a and 40b. Traces extending from the probes 42a and 42b carry the power and comunications to the LED array 34 and the detector array 36.

The optical card reader 22 can be made compact. A 100 megabyte optical card having a 400×600 array of data patches 18 could have an estimated size of 40×60×1 millimeters. An optical reader 22 for such an optical card 10 might have a 400×1 array of LEDS, a 100×3500 array of detector elements. The carrier 30 might have a size of 46×3×3 millimeters, an LED chip including the LED array 34 might occupy an area of approximately 40×0.5 millimeters, a detector array 36 including the detector elements might occupy an area of approximately 42×1.2 millimeters, and each detector element might have a pixel size of approximately 12 microns. Such an optical card reader 22 itself might have an overall length of approximately 60 millimeters, an overall width of approximately 40 millimeters, and an overall thickness of approximately 5 millimeters. Such an optical card reader 22 can be fit inside a PCMCIA slot of a notebook computer. In certain instances, the optical reader 22 could be substituted for a CD-ROM drive. If the CD-ROM is replaced by the optical reader 22, the profile and weight of the notebook would be reduced.

Power consumption can also be reduced. It is estimated that power consumption of the optical reader 22 would be approximately 100 milliwatts for reading one patch at a time at a data rate of approximately one megabyte/second.

Figure 7A:
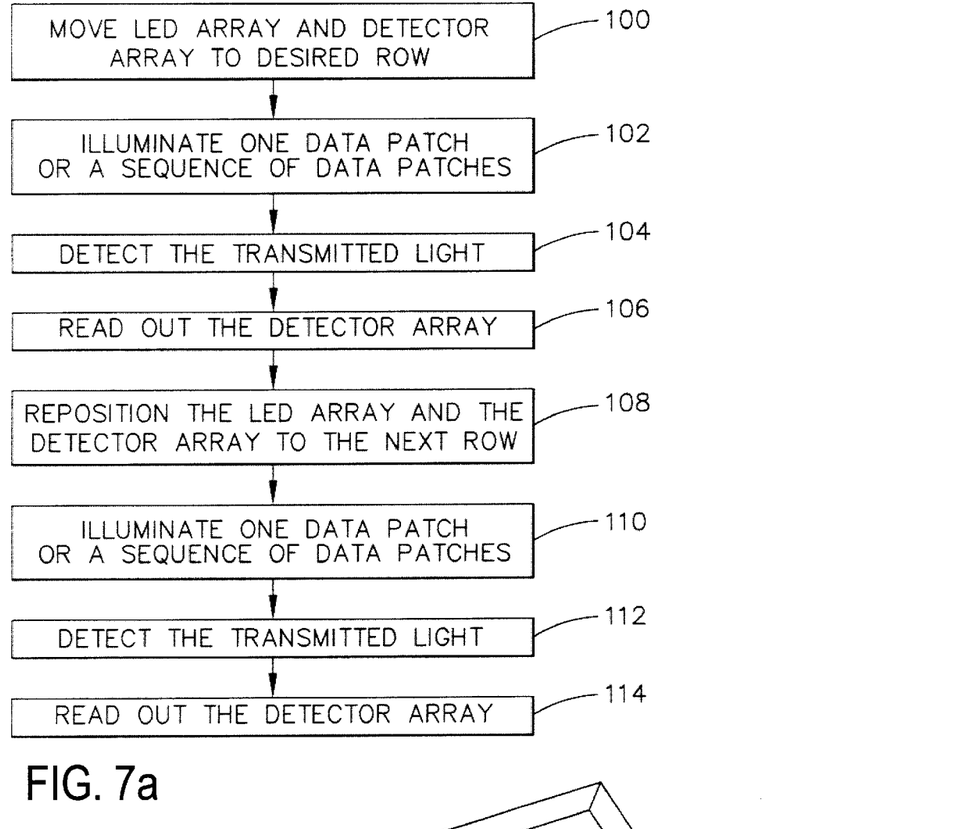
FIG. 7a is a flowchart of a method of reading data from the optical card.

FIG. 7 shows a method of reading data from the optical card 10. The LED array 34 and the detector array 36 are moved to a desired row (block 100). Once the detector array 36 is aligned with a data patch in the desired row, a single data patch 18 is illuminated or a sequence of data patches 18 in the row is illuminated (block 102). Light transmitted through the optical card 10 is detected by the detector array 36 (block 104), and detected bit images are read out to processing electronics (block 106).

After the data has been read out, the LED array 34 and the detector array 36 are repositioned at a different row of the optical card 10 (block 108). A single data patch 18 or a sequence of data patches 18 in the different row is illuminated (block 110), light transmitted through the optical card 10 is detected by the detector array 36 (block 112), and the detected bit images are read out to processing electronics (block 114).

Figure 7B:
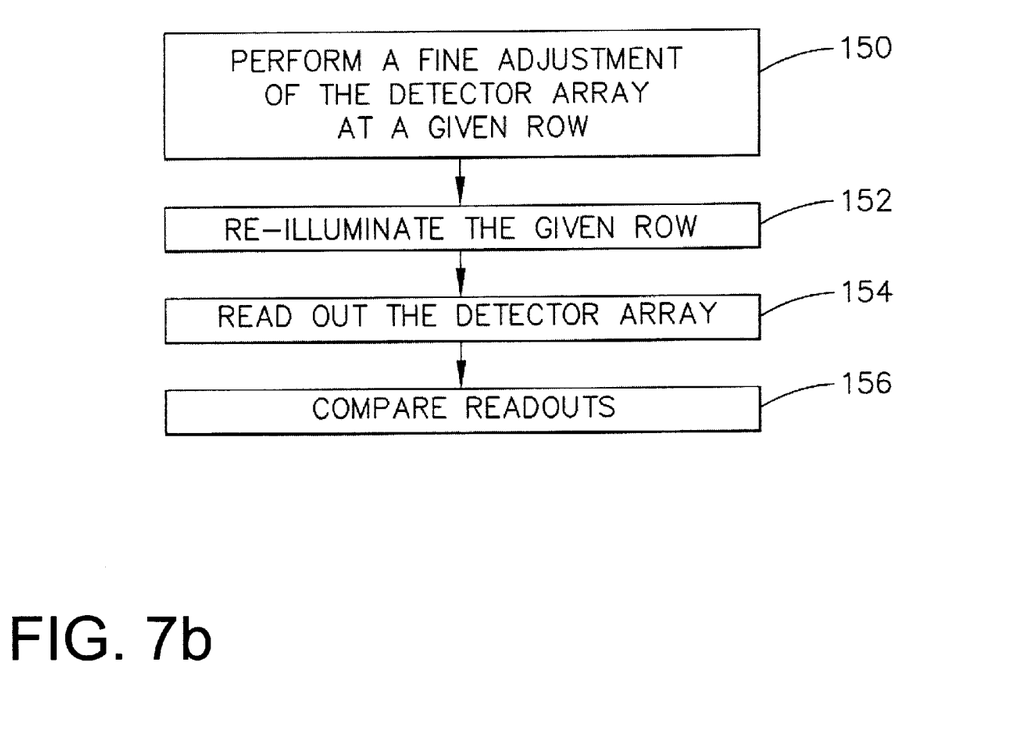
FIG. 7b a is a flowchart of a method of verifying the accuracy of data read from the optical card.

FIG. 7a shows a method of verifying the accuracy of data read out at a given row of the optical card 10. The optical card reader 10 can verify the accuracy of the data by performing small (sub-row) movements of the carrier assembly 26 (block 150), repeating the scan of the data patches 18 (block 152), reading out the data (block 154), and comparing the data read out at the new position to the data read out at the previous position (block 156).

Thus disclosed is a low-cost, low-power, low-profile optical card reader 22. Its thickness, including the total imaging path along with all the reader components, can add up to less than five millimeters. This makes the optical card reader 22 readily adaptable to fit in the space allocated for PCMCIA cards in portable computing/electronic devices such as notebook computers, personal digital assistants, smart phones, portable scanners, printers and handheld games.

The optical card reader 22 according to the present invention has lower power consumption than CD-ROM drives and beam-steerable optical readers. Moreover, the optical card reader 22 according to the present invention has a lower cost than the beam-steerable optical readers. It may use a single row of LEDs and a relatively small strip of a detector elements instead expensive steering optics.

Figure 8:
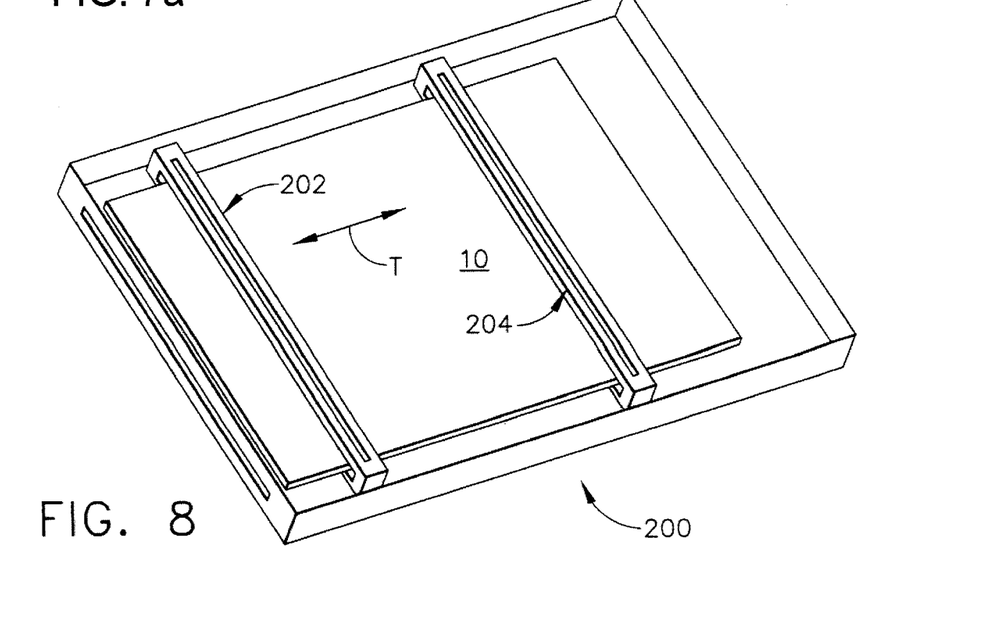
FIG. 8 is an alternative embodiment of the optical card reader.

The optical card reader 22 according to the present invention is not limited to the specific embodiment described above. For example, an optical card reader 200 may include first and second carrier assemblies 202 and 204 (see FIG. 8). The first and second carrier assemblies 202 and 204 may be independently movable in a scanning direction T, or they can be jointly movable in the scanning direction T.

Other modifications may include the use of Vertical Cavity Surface Emitting Lasers (VCSELS) instead of LEDS. VCSELS are typically built in arrays of eights and tens; therefore, arrays of VCSELS would have to be ganged in order to illuminate a row of data patches.

Other considerations, such as geometry of the optical card and size of the detector array, will depend upon factors such as desired cost and speed of the optical card reader. Optical readers having larger detector arrays that can cover multiple rows of data patches will generally be faster but more expensive than optical readers having smaller detector arrays that can cover at most a single row of data patches. Optical cards that are longer and thinner will take longer to scan than optical cards that are shorter and wider. Of course, longer arrays of LEDS and detectors would be used to read the shorter, wider cards.

Accordingly, the invention is not limited by the specific embodiment above. Instead, it is to be construed according to the claims that follow.

What is claimed is:

1. An optical card reader comprising:

an optical card guide;

a carrier movable along the card guide in a linear scanning direction;

an illuminator mounted to the carrier, the illuminator having a light-emitting surface; and a detector mounted to the carrier, the detector having a light-receiving surface, the light-emitting surface of the illuminator being opposite and spaced apart from the light-receiving surface of the detector;

the carrier moving the illuminator jointly with the detector when the carrier is being moved in the scanning direction.

2. The optical reader of claim 1, wherein the card guide is adapted to receive an optical card, and wherein the light-emitting and light-receiving surfaces are spaced apart by approximately a thickness of the optical card plus a clearance thickness.

3. The optical reader of claim 2, wherein the light-emitting and light-receiving surfaces are spaced apart by less than one millimeter and the reader has a thickness less than five millimeters.

4. The optical reader of claim 1, wherein the carrier, the detector and the illuminator are formed into a single unit.

5. The optical reader of claim 1, wherein the illuminator includes a linear array of controllable light-emitting sources.

6. The optical reader of claim 5, wherein the illuminator includes a single row of the light-emitting sources, each light source being operable to illuminate a single data patch.

7. The optical reader of claim 6, wherein the light-emitting sources are movable as a group in the scanning direction and disposed in a direction orthogonal to the scanning direction.

8. The optical reader of claim 7, wherein the light-emitting sources are independently operable, whereby the optical reader can perform random access of data patches in a row.

9. The optical reader of claim 1, wherein bit images are focused on the light-receiving surface during a read operation, wherein the detector can detect light from at least one bit image, and wherein each detector element of the detector can detect a bit in the bit image.

10. The optical reader of claim 9, wherein the card guide is adapted to receive an optical card including a plurality of rows of data patches, wherein bit images of adjacent data patches are over-lapping on the light-receiving surface of the detector, and wherein overlapping bit images are not read out simultaneously.

11. The optical reader of claim 1, further comprising means for supplying power and data to the illuminator and the detector.

12. The optical reader of claim 11, wherein the power and data means includes conductive sidewalls opposite a first surface of the carrier, the carrier being movable relative to the sidewalls; and contact probes extending from the first surface of the carrier and making physical contact with the conductive sidewalls.

13. The card reader of claim 1, further comprising:

a second carrier movable in the linear scanning direction;

a second detector mounted to the second carrier, the second detector having a second light-receiving surface; and a second illuminator mounted to the second carrier, the second illuminator having a second light-emitting surface.

14. The optical reader of claim 1, further comprising a printed circuit board mounted to the carrier and processing electronics mounted to the printed circuit board.

15. A scanning assembly for an optical card reader, the scanning assembly comprising:

a linear LED array including a plurality of light-emitting sources;

a linear detector array including a plurality of detector elements; and a carrier for carrying the LED array and the detector array, a light-emitting surface of the LED array being opposite a light-receiving surface of the detector array, the light-emitting surface of the LED array being spaced apart from the light-receiving surface of the detector array by a distance that allows an optical card to be interposed between the surfaces, the distance also allowing bit images from the optical card to be focused onto the light-receiving surface when the optical card is interposed between the surfaces and data patches on the optical card are illuminated by the LED array.

16. The scanning assembly of claim 15, further comprising a printed circuit board mounted to the carrier, and processing electronics mounted to the printed circuit board.

17. The scanning assembly of claim 15, wherein the carrier, the detector array and the LED array are formed into a single unit.

18. A method of reading data from an optical card, the optical card including a plurality of data patches, the data patches being arranged in rows, the method comprising the steps of:

moving a detector array to a given row of the optical card;

illuminating a patch on the given row of the data card;

using the detector array to detect light transmitted through the card;

reading out the detector array;

repositioning the detector array to a different row of the card;

illuminating a patch on the different row of the data card;

using the detector array to detect light transmitted through the card; and reading out the detector array.

19. The method of claim 18, wherein the data patches are illuminated sequentially while a row of data patches is being accessed.

20. The method of claim 18, further comprising the steps at the given row of:

performing a fine adjustment of the detector array;

re-illuminating the data patch;

reading out the detector array; and comparing data readouts.

* * * * *